US012675578B2

(12) United States Patent
Hulick, Jr. et al.

(10) Patent No.: US 12,675,578 B2
(45) Date of Patent: Jul. 7, 2026

(54) OPERATIONAL CHARACTERISTIC-BASED CONTAINER MANAGEMENT

(71) Applicant: Cisco Technology, Inc., San Jose, CA (US)

(72) Inventors: Walter Theodore Hulick, Jr., Pearland, TX (US); David John Zacks, Vancouver (CA); Thomas Szigeti, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 18/213,983

(22) Filed: Jun. 26, 2023

(65) Prior Publication Data

US 2024/0427899 A1     Dec. 26, 2024

(51) Int. Cl.
*G06F 21/57*          (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 8,713,163 | B2 | 4/2014 | Teather |
| 10,243,973 | B2 | 3/2019 | Leemet et al. |
| 10,567,406 | B2 | 2/2020 | Astigarraga et al. |

| | | | | |
|---|---|---|---|---|
| 2005/0022185 | A1* | 1/2005 | Romero | .............. G06F 11/3466 |
| | | | | 714/E11.2 |
| 2016/0277249 | A1* | 9/2016 | Singh | ................... H04L 67/1097 |
| 2017/0093923 | A1* | 3/2017 | Duan | ................... G06F 11/2028 |
| 2017/0116412 | A1* | 4/2017 | Stopel | ..................... G06F 21/53 |
| 2018/0018675 | A1* | 1/2018 | Ekambaram | ......... G06Q 30/018 |
| 2018/0285166 | A1* | 10/2018 | Roy | ...................... G06F 9/5077 |
| 2019/0020665 | A1* | 1/2019 | Surcouf | ................ H04L 9/3236 |
| 2019/0394219 | A1* | 12/2019 | Huang | ..................... G06F 9/455 |
| 2020/0034558 | A1* | 1/2020 | Barboy | .............. G06F 21/6218 |
| 2021/0160162 | A1 | 5/2021 | Abbas | |
| 2021/0352077 | A1* | 11/2021 | Benedetti | .................. H04L 9/50 |

(Continued)

OTHER PUBLICATIONS

"What is AWS Resource Explorer?", online: https://docs.aws.amazon.com/resource-explorer/latest/userguide/welcome.html, accessed Jun. 21, 2023, 5 pages, Amazon Web Services, Inc.

(Continued)

*Primary Examiner* — Fatoumata Traore
(74) *Attorney, Agent, or Firm* — Lee & Hayes, P.C.

(57)          ABSTRACT

In some embodiments, operational characteristics-based container management may include receiving, by a device and from a container agent executing in a container environment, operational characteristics of an application instance executing in the container environment; determining, by the device and based on the operational characteristics, whether the application instance executing in the container environment is associated with a policy violation for application instances; generating, by the device, a notification of the policy violation when the device determines that the application instance is associated with the policy violation; and causing, by the device, the container environment to perform a mitigation action of the policy violation by the application instance.

20 Claims, 5 Drawing Sheets

(56) References Cited

U.S. PATENT DOCUMENTS

| 2022/0103593 | A1* | 3/2022 | Singh | .................. H04L 63/0245 |
| 2022/0350663 | A1 | 11/2022 | Toal et al. | |
| 2024/0256659 | A1* | 8/2024 | Hyder | ................... G06F 21/566 |

OTHER PUBLICATIONS

"Google Resource Manager API Client for Java", online: https://github.com/googleapis/java-resourcemanager, accessed Jun. 21, 2023, 9 pages, GitHub, Inc.
"Oracle Cloud—Managing and Monitoring Oracle Cloud", release 19.3, E64158-58, Jun. 2022, 138 pages, Oracle.

* cited by examiner

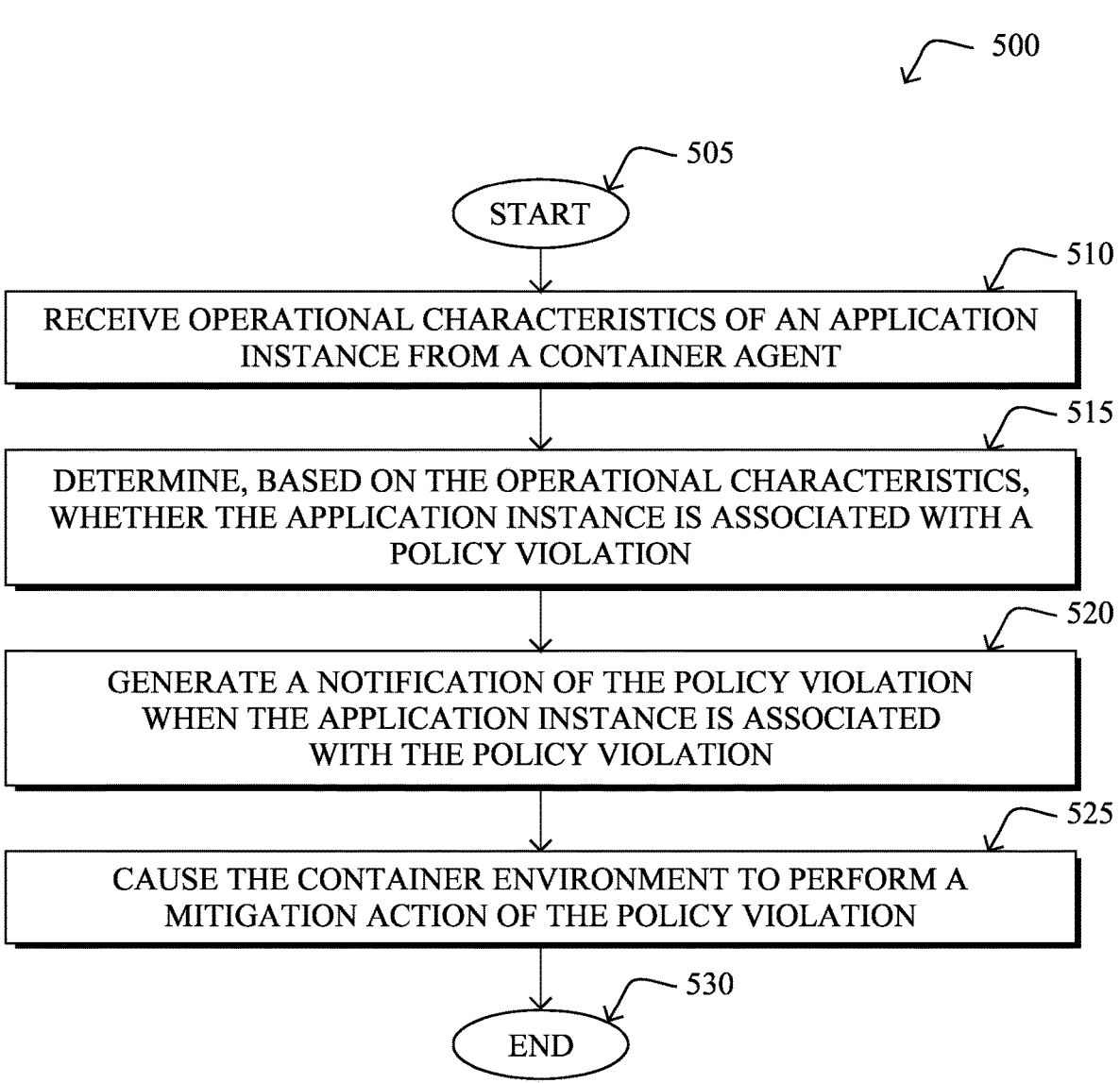

500

505

START

510

RECEIVE OPERATIONAL CHARACTERISTICS OF AN APPLICATION
INSTANCE FROM A CONTAINER AGENT

515

DETERMINE, BASED ON THE OPERATIONAL CHARACTERISTICS,
WHETHER THE APPLICATION INSTANCE IS ASSOCIATED WITH A
POLICY VIOLATION

520

GENERATE A NOTIFICATION OF THE POLICY VIOLATION
WHEN THE APPLICATION INSTANCE IS ASSOCIATED
WITH THE POLICY VIOLATION

525

CAUSE THE CONTAINER ENVIRONMENT TO PERFORM A
MITIGATION ACTION OF THE POLICY VIOLATION

530

END

FIG. 5

OPERATIONAL CHARACTERISTIC-BASED CONTAINER MANAGEMENT

TECHNICAL FIELD

The present disclosure relates generally to computer systems, and, more particularly, to operational characteristic-based container management.

BACKGROUND

Cloud computing has revolutionized the way businesses operate, providing flexible and on-demand access to a wide range of computing resources and services. However, as more organizations adopt cloud computing, they face challenges related to inefficient utilization of computing resources, which can have significant consequences.

For example, organizations frequently and unknowingly underutilize reserved cloud resources, operate unsecure and/or orphaned application instances with cloud resources, support superfluous network traffic with cloud resources, etc. It is not uncommon for these inefficiencies to constitute forty percent or more of their cloud resource utilization. Consequently, vast amounts of computational resources are currently invisibly underutilized and/or wasted. These inefficiencies in cloud resource utilization degrade application performance, network performance, computational performance, application security, etc.

Overall, efficient utilization of cloud resources is critical for organizations to realize the benefits of cloud computing. Unfortunately, there are no existing mechanisms that proactively provide the types of granular insights into an organization's cloud resource utilization and/or facilitate mitigation of resource misutilization and security risk exposure.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 illustrates an example of a simplified procedure for operational characteristic-based management.

DESCRIPTION OF EXAMPLE EMBODIMENTS

Overview

According to one or more embodiments of the disclosure, a method may include receiving, by a device and from a container agent executing in a container environment, operational characteristics of an application instance executing in the container environment; determining, by the device and based on the operational characteristics, whether the application instance executing in the container environment is associated with a policy violation for application instances; generating, by the device, a notification of the policy violation when the device determines that the application instance is associated with the policy violation; and causing, by the device, the container environment to perform a mitigation action of the policy violation by the application instance. Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example of a computer network.
Figure 1:
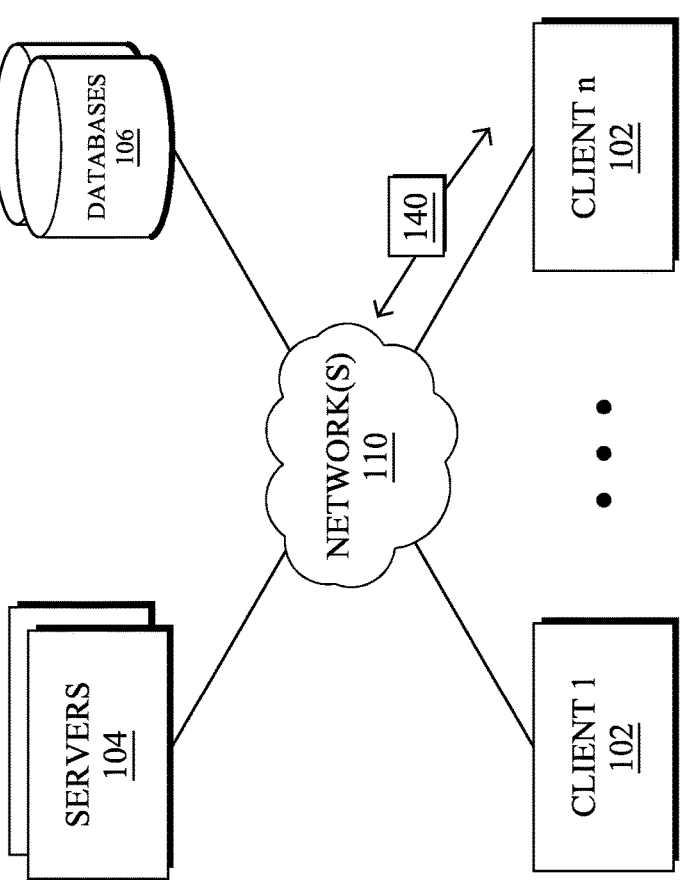

FIG. 1 is a schematic block diagram of an example of a simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in simplified computing system 100, and that the view shown herein is for simplicity. Also, those skilled in the art will further understand that while the network is shown in a certain orientation, the simplified computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
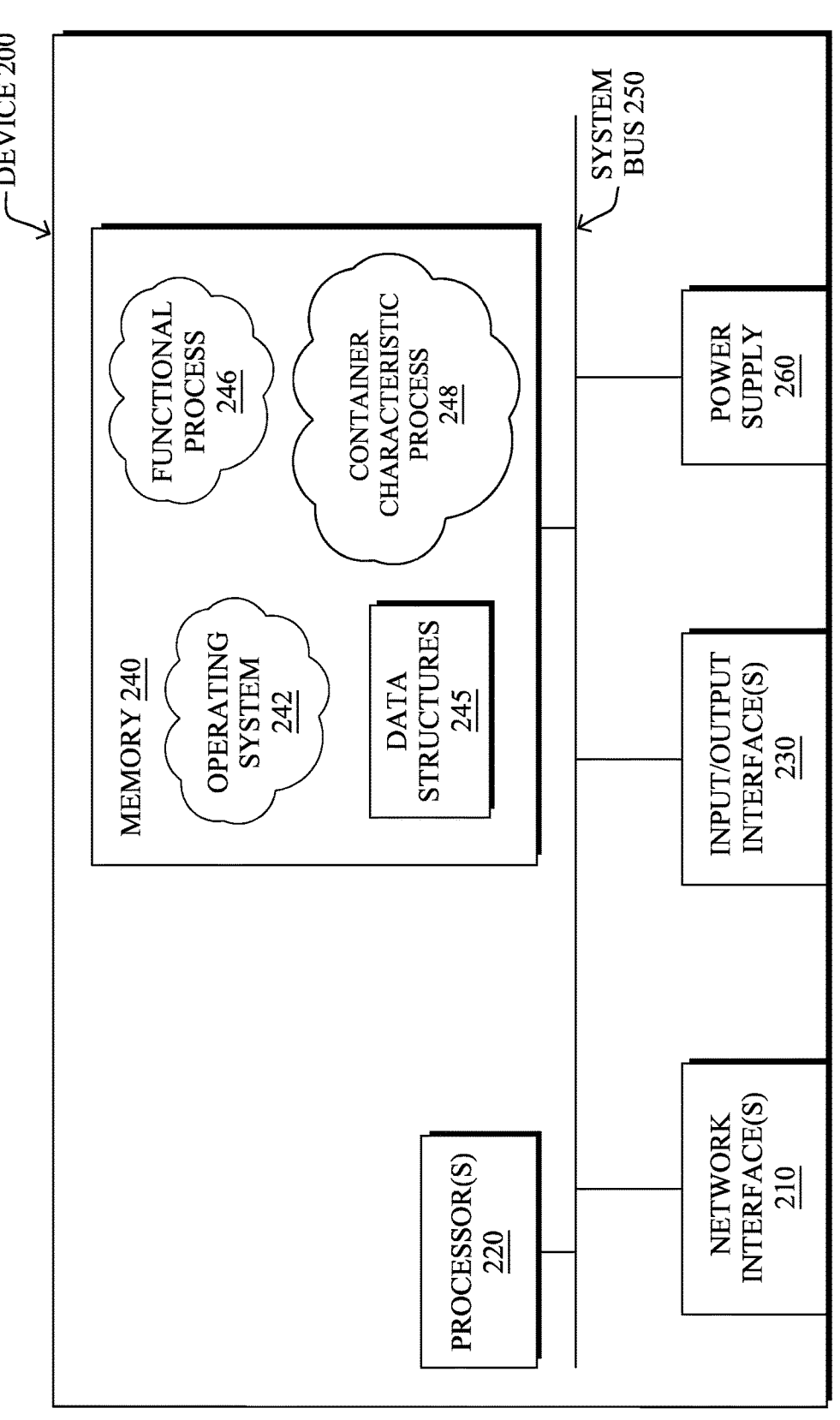
FIG. 2 illustrates an example of a computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

Memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative container characteristic process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Observability Intelligence Platform——

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT)

operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that monitoring resource utilization and/or troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
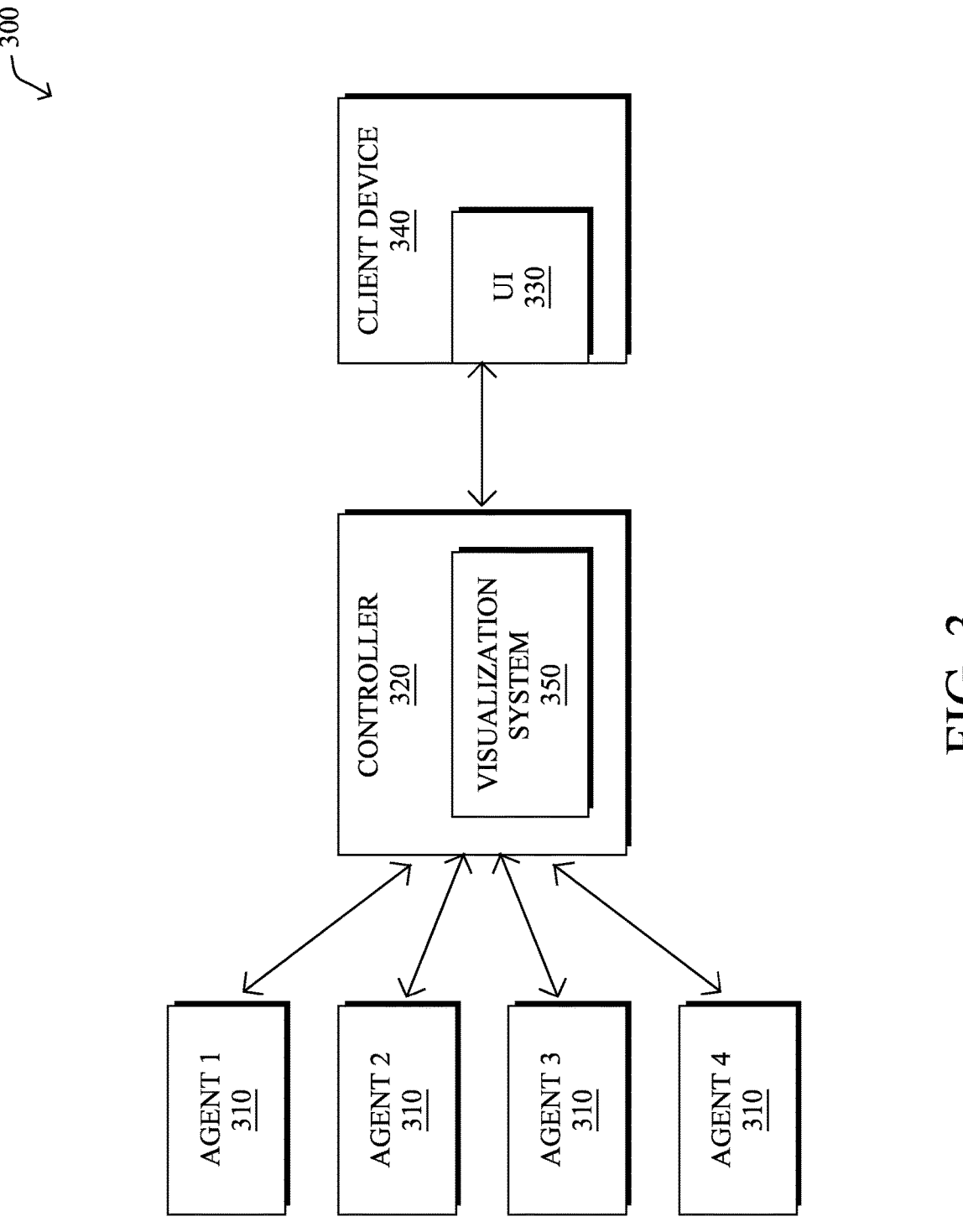
FIG. 3 illustrates an example of an observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface 330 (UI) that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller 320 instance may be hosted remotely by a provider of the observability intelligence platform 300. In an illustrative on-premises (On-Prem) implementation, a controller 320 instance may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure. The observability intelligence platform and methods described herein are also applicable to monolithic systems (that are not distributed systems) such as the MACOS or Windows based system running a browser or running the MSOFFICE application, and/or decentralized systems such as smart contracts running on blockchain-based de-centralized systems.

In various embodiments, organizations may wish to operate a resource manager as a component of, in concert with, and/or alongside an observability intelligence platform. A resource manager may utilize a similar architecture to that of an observability intelligence platform in order to monitor, audit, and/or manage cloud resource (e.g., computational resources, network resources, etc.) utilization and configuration among their application instances.

As noted above, organizations lose visibility of cloud resource utilization and application/virtual environment configuration after their initial allocation and configuration. For instance, when organizations initially place an order with a cloud service provider (e.g., AWS, Google Cloud, Azure, etc.) they will specify requirements such as CPU size, memory size, disk size, other services, max instances of container of the image, etc. Often, they will overestimate or simply decide it is better to be safe than sorry and subscribe to the view of application stakeholders imploring that 'bigger is better'. This can lead to over reservation/underutilization of cloud resources allocated to application instances.

Additionally, organizational focus and priorities may change, employees may leave, etc. resulting in application instances and/or accounts becoming orphaned. As a result, these instances and/or accounts become computational and security liabilities that may miss maintenance, updates, patches, etc. Further, some services that are not intended or understood to be generating network traffic may, in fact, be generating network traffic. Furthermore, network traffic of various instances may be non-critical superfluous network traffic.

Unfortunately, there are no existing mechanisms to proactively provide the types of granular insights into these aspects of an organization's cloud resource utilization. Therefore, there is presently no way to proactively mitigate resource misutilization, security risk exposure, and/or network traffic optimization across cloud-based application instances. Instead, vast amounts of computational and network resources are currently invisibly underutilized and/or wasted and security risks are left exposed for exploitation. These inefficiencies in cloud resource utilization degrade application performance, network performance, computational performance, application security, etc.

——Operational Characteristic-Based Container Management——

The techniques herein introduce a monitoring, altering, and locating mechanism to mitigate resource misutilization, security risk exposure, and network traffic inefficiencies among application instances executing in virtual environments such as a container environment.

Illustratively, the techniques described herein may be performed by hardware, software, and/or firmware, such as in accordance with container characteristic process 248, which may include computer executable instructions executed by the processor 220 (or independent processor of interfaces 210) to perform functions relating to the techniques described herein.

Specifically, according to various embodiments, a method may include receiving, by a device and from a container agent executing in a container environment, operational characteristics of an application instance executing in the container environment; determining, by the device and based on the operational characteristics, whether the application instance executing in the container environment is associated with a policy violation for application instances; generating, by the device, a notification of the policy violation when the device determines that the application instance is associated with the policy violation; and causing, by the device, the container environment to perform a mitigation action of the policy violation by the application instance.

Figure 4:
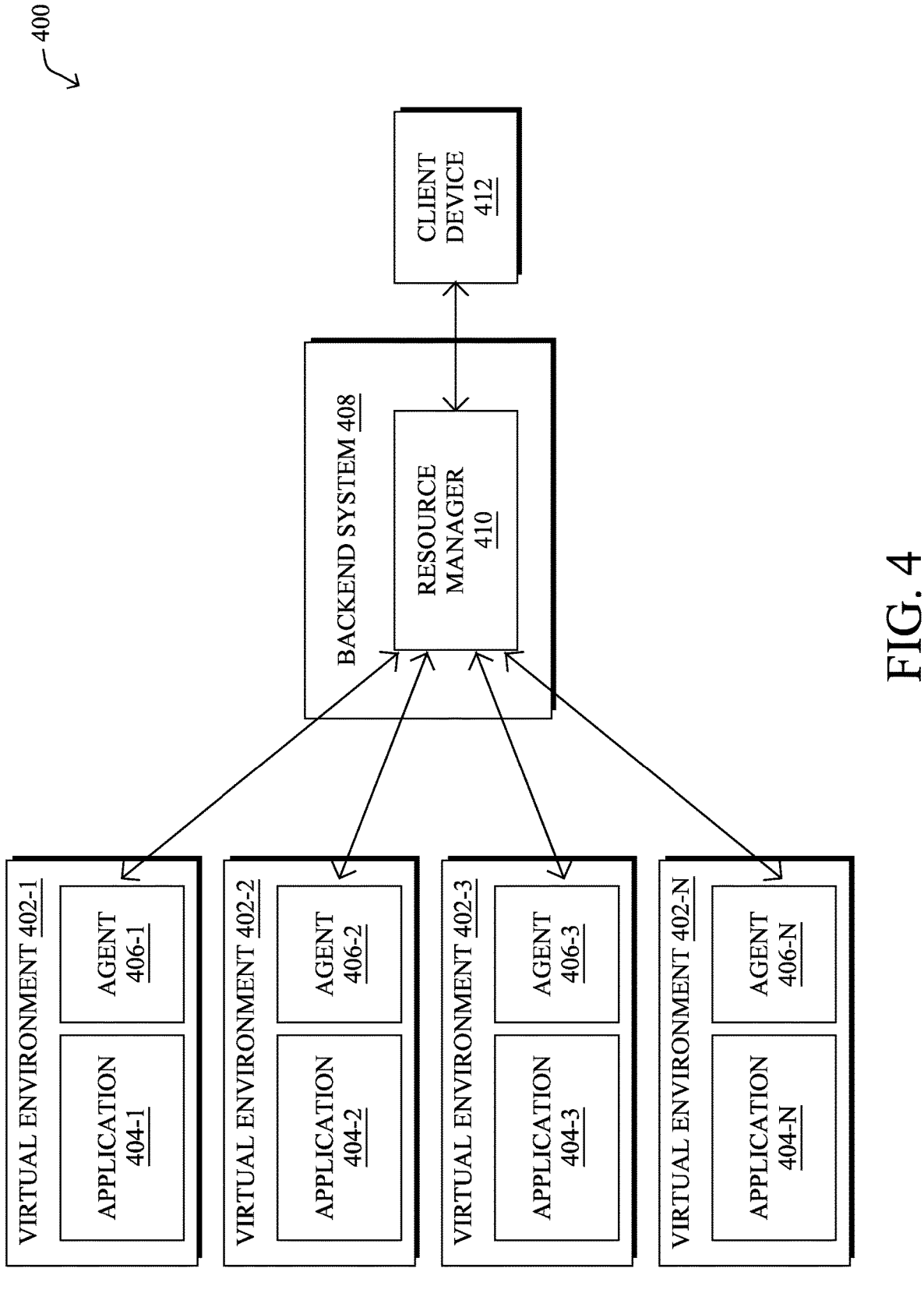
FIG. 4 illustrates a block diagram of an example of an operational characteristic-based management platform.

Operationally, and according to various embodiments, FIG. 4 is a block diagram of an example of an operational characteristic-based management platform 400 that can implement one or more aspects of the techniques herein. The operational characteristic-based management platform 400 may be a standalone platform for operational characteristic-based virtual environment and resource management and/or may be used in concert with or as a component of an observability intelligence platform (e.g., observability intelligence platform 300 of FIG. 3).

Operational characteristic-based management platform 400 may be a system that monitors, collects, assesses, communicates, manages, etc. communications and/or virtual environment resource utilization associated with one or more application instance 404 (e.g., 404-1 . . . 404-N). Each application instance 404 may be hosted within a virtual environment 402 (e.g., 402-1 . . . 402-N) and executed utilizing the cloud resources assigned thereto. In an example, each application instance 404 may be hosted in an individual and/or respective virtual environment 402. In a further example, a virtual environment may host more than one application instance which will split or otherwise share the resources of the shared virtual environment.

The virtual environment 402 may be a container environment. Each virtual environment 402 and/or application instance 404 may have a configuration that specifies resources (e.g., RAM, CPU, Memory capacity, disk size, other services, etc.) allocated thereto. The resource allocation may specify the resources assigned to and/or reserved for the execution of the application instance 404 in the virtual environment 402.

Operational characteristic-based management platform 400 may monitor, collect, and/or report operational characteristics and/or cloud configurations of an application instance 404 executing in its virtual environment 402. Specifically, operational characteristic-based management platform 400 may utilize one or more agent 406 (e.g., 406-1 . . . 406-N) to perform this monitoring, collection, and/or reporting. The agent 406 may be a container agent integrated within a container virtual environment.

Agent 406 may be deployed within each virtual environment 402 hosting an application instance 404 and/or be deployed within each application instance 404. Agent 406 may monitor, collect, and/or communicate operational characteristics and/or cloud configurations of a corresponding application instance 404 executing in the virtual environment. In some instances, agent 406 may monitor, collect, and/or communicate operational characteristics and/or cloud configurations of more than one corresponding application instance executing in the same virtual environment 402.

Each agent 406 may be instrumented into the application runtime (e.g., Bytecode instrumentation (BCI), etc.), instrumented to the operating system (e.g., basic shell commands, etc.), instrumented using cloud APIs in the application and/or curl commands to get instance/container configuration and sizing information, etc. Once instrumented, agent 406 may monitor and collect operational characteristics by monitoring the execution of the application instance 404, network traffic associated with the execution of the application instance 404, virtual environment configurations, virtual environment resource utilization, application instance 404 configurations, etc.

The operational characteristics monitored, collected, and, in some instances, communicated by agent 406 may include computational resource usage metrics for the application instance 404 executing in the virtual environment 402. For instance, operational characteristics may include RAM utilization associated with execution of application instance 404, CPU utilization associated with execution of application instance 404, memory capacity utilization associated with execution of application instance 404, disk utilization associated with execution of application instance 404, error rates associated with execution of application instance 404, response times associated with execution of application instance 404, etc. and/or metrics thereof. The operational characteristics may be metricized in the context a corresponding configuration of the application instance 404 and/ or its virtual environment 402 (e.g., as percentage of computational resources allocated to an application instance 404 and/or the virtual environment 402 hosting the application instance 404 as specified in the configuration).

In addition, the operating characteristics may include usage and/or activity levels of an application instance 404. For instance, operational characteristics may include an amount of network traffic associated with execution of application instance 404, an amount of requests made in association with execution of application instance 404, a frequency of network traffic associated with execution of application instance 404, a timing of network traffic associated with execution of application instance 404, etc. and/or metrics thereof.

Further, the operating characteristics may include security status indicators of an application instance 404. For example, operational characteristics may include a security patch status of an application instance 404, such as when the application instance 404 last received a security patch, the success or failure of a security patch applied to the application instance 404, a version or other indicator of the security patches applied to the application instance 404, etc. and/or metrics thereof.

Likewise, operational characteristics may include an update status of an application instance 404, such as when the application instance 404 last received an update, the success or failure of an update applied to the application instance 404, a version or other indicator of the updates applied to the application instance 404, etc. and/or metrics thereof.

Also, operational characteristics may include admin activity associated with the application instance 404, such as an indication of when an admin interacted with, accessed, audited, modified, etc. an application instance 404, when a troubleshooting, debugging, patching, updating, etc. was undertaken by an admin for the application instance 404, when an admin reviewed data associated with the deployment, existence, operation, execution, performance, network traffic, etc. of the application instance 404, and/or metrics thereof.

These operational characteristics may include any indication or metric of the application instance 404 useful in making a determination as to whether the application instance 404 has been orphaned and/or improperly maintained or utilized. In various embodiments, the operational characteristics may include an indication of a period (time, date, etc.) since a previous assessment of the cloud resource utilization of the application instance 404 and/or virtual environment 402 by the operational characteristic-based management platform 400. That is, the operational characteristics may provide a mechanism for keeping track of the last time that a resource manager 410 determined that an application instance 404 and/or virtual environment 402 either did or did not violate a policy as described in greater detail below.

Operational characteristics may also include characteristics of network traffic associated with the application instance 404 and/or its virtual environment 402. For example, agent 406 may monitor network traffic to, from, and/or associated with execution of application instance 404 to collect operational characteristics indicating the identity, characteristics, volume, criticality, and/or metrics thereof. In various embodiments, these operational characteristics may include protocols and/or services associated with the monitored network traffic. In addition, these operational characteristics may include a characterization of the business purpose and/or particular functions or transactions handled by the application instance 404 that are associated with the monitored traffic. In some instances, these operational characteristics may include an indication of communication paths and/or participants for the monitored traffic.

Each agent 406 may report the operational characteristics that it has collected to a resource manager 410. The resource manager 410 may be instrumented on a backend system 408. The backend system 408 may include a backend cloud system, a backend controller, a backend server, etc. that operates as the central processing and administration server for the operational characteristic-based management platform 400. The resource manager 410 instrumented on the backend system 408 may utilize the operational characteristic data provided by each agent 406 to develop and provide (e.g., in real time) valuable and proactive insight into resource utilization, security risks, and network traffic criticality, among other things, for each application instance 404 (e.g., cloud-based) used in development, production, etc.

In various embodiments, the resource manager 410 may receive and/or ingest the operational characteristics reported from each agent 406. The resource manager may be configured to analyze the operational characteristics according to one or more policies. The policies may be specific to a particular application instance or virtual environment. The policies may be configurable. For example, each policy may be able to be configured and/or modified by a user, a machine learning platform, statistical analysis of operational characteristics from the same application instance or another application instance, etc. That is, both self-learned baselines or thresholds and user configurable baselines and thresholds may be used to identify normal behavior or, conversely, to identify resource misallocation, security risks, and/or network traffic issues.

The baselines or threshold defined by the policies may operate as trigger points at which alerts, reports, communications, etc. may be generated for and/or provided to users. For instance, the baselines or thresholds may define operational characteristic values or events at which resource manager 410 may generate a notification of a policy violation by the application instance 404 being monitored.

Resource manager 410 may generate and/or deliver such notifications in a variety of ways. For instance, resource manager 410 may provide an operational characteristic-based virtual environment management dashboard and/or provide data thereto. This dashboard may be utilized for operational characteristic reporting, configuration of active policies, cloud resource allocation, virtual environment management, application instance management, etc. The resource manager 410 may provide notifications, visualizations, reports, etc. of operational characteristics and/or their policy violations (e.g., alert threshold met or crossed by operational characteristics) via the dashboard which may be accessible by a user (e.g., via a user interface of a client device 412). Likewise, resource manager 410 may provide these real-time notifications (e.g., via text, email, etc. to one or more client device 412) directly to distribution groups, responsible contacts, etc.

Realization that these trigger points have occurred at the application instance 404 and/or the virtual environment 402 may be accomplished by comparison of ingested operational characteristics to their corresponding baselines or thresholds specified in the policies. When this comparison reveals that the ingested operational characteristics have met or exceeded and/or are predicted (e.g., via trend data, extrapolations, etc.) to meet or exceed the baselines or thresholds established in the policies, then notification of the same may be initiated.

In a specific example, the resource manager 410 may compare the operational characteristics it has ingested for an application instance 404 and/or a virtual environment 402 to a corresponding configuration associated with that application instance 404 and/or virtual environment 402. For instance, resource manager 410 may compare ingested operational characteristics to a corresponding computational resource allocation (e.g., RAM, CPU, Memory Capacity, Disk Size, etc.) for the virtual environment 402 or application instance 404 whence the operational characteristics were collected. It should be appreciated that the operational characteristics may be a single characteristic, metric, measurement, etc. or may be a compilation (e.g., average, trend, time series, extrapolation, etc.) of characteristics, metrics, measurements, etc. The configuration may specify the resources allocated to execution of the application instance 404 in the virtual environment 402, while the operational characteristics may be the resources actually used by the execution of the application instance 404. Therefore, the resource manager 410 may compare the baseline of observed resource usage to the resource usage capacity assigned to the application instance 404 and/or the virtual environment 402 hosting it. This may yield an indication of a proportion or percentage of the assigned resources which are being used in the execution of an application instance 404.

The resource manager 410 may reference the policy associated with the application instance 404 and/or the virtual environment 402 hosting the application instance 404 to determine the baseline or threshold (e.g., if a percent used metric falls below a specific threshold based on a specific timeframe) at or beyond which a notification should be generated and/or transmitted. When the resource manager 410 determines that the threshold has been met or exceeded by the operational characteristics ingested for the application instance 404 or virtual environment 402, it may cause a notification of this policy violation and/or a representation of the corresponding ingested operational characteristic data to be generated and/or provided. The notification may be sent as an alert via email, text, etc., emailed as a report, provided via a dashboard, etc. to a user.

In another example, resource manager 410 may compare ingested operational characteristics indicative of usage and/or activity levels associated with an application instance 404 to a threshold level of usage and/or activity specified in a policy for the application instance 404 from which the operational characteristics were collected. If this comparison indicates that the usage and/or activity level of the application instance 404 observed by the agent 406 is at or below the threshold level, then the resource manager may cause a notification of this policy violation and/or a representation of the corresponding ingested operational characteristic data to be generated for and/or provided to a user.

As a further example, resource manager 410 may compare ingested operational characteristics indicative of a security status of an application instance 404 to a corresponding security status threshold specified in a policy for the application instance 404 from which the operational characteristics were collected. The security status threshold may include security patch, update, admin activity, etc. thresholds. These thresholds may specify, for example, a minimum required patch or update version or recency of patching or updating, a minimum amount or recency of admin activity, etc. for the application instances of the same type as the application instance 404 from which they were collected. If this comparison reveals that the application instance 404 is violating the policy by meeting or exceeding one of these thresholds, then resource manager 410 may determine that the application instance 404 is out of compliance, orphaned, and/or is a security risk. As a result, resource manager 410 may cause a notification of this policy violation and/or a representation of the corresponding ingested operational characteristic data to be generated for and/or provided to a user.

As another example, resource manager 410 may compare ingested operational characteristics related to the network traffic monitored for an application instance 404 and/or a virtual environment 402 to network traffic thresholds or requirements specified in a corresponding policy. For example, these network traffic operational characteristics may be compared to thresholds or requirements regarding traffic criticality for the application instance 404. This comparison may involve comparing ingested network traffic operational characteristics against known protocols, approved associated services, business and technical goals, approved data access and communications, approved communication relationships with other resources, etc. specified in the policy. Resource manager 410 may determine that network traffic associated with the application instance 404 is non-critical and/or violates a policy when, for example, the comparison reveals that the monitored network traffic does not match a known protocol, involves communication outside of an approved associated service, it is not related to specified business and technical goals, involves non-authorized data access and communications, implicates non-authorized communication relationships with other resources etc. In such instances, resource manager 410 may cause a notification of this policy violation and/or a representation of the corresponding ingested operational characteristic data to be generated for and/or provided to a user. Further, resource manager 410 may cause such traffic (e.g., automatically, responsive to user authorization, etc.) to be highlighted and/or blocked at the application instance 404. This blocking may be automatic.

In some instances, the resource manager 410 may incorporate an expiration-triggered application instance behavior review system to prevent its analysis from becoming stale with respect to a virtual environment 402 and/or an application instance 404. For example, resource manager 410 may assign an expiration date (or other event-triggered or time-related expiration period) to the application instance 404 executing in a virtual environment 402. Upon reaching the expiration period (e.g., since instantiated, since a prior review of its operational characteristics, etc.), resource manager 410 may flag that application instance 404 for a policy violation review (e.g., a comparison of its current operational characteristics with the current policies). This flagging may then cause the agent 406 to collect and communicate the current operational characteristics from the flagged application instance if this is not already occurring. The flagging may also cause the resource manager 410 to ingest and analyze the current operational characteristics collected with respect to the flagged application instance if this is not already occurring.

Resource manager 410 may also provide a web-based interface viewable by a client device 412. In some implementations, a client device 412 can directly communicate with backend system 408. This communication can include user interactions with a dashboard or other interface to monitor and manage cloud resource allocations, policy violations, operational characteristics, and/or application instance deployments. For example, a user may utilize a client device 412 to analyze and visualize policy violations. In addition, the user may utilize the client device 412 to select, approve, or review mitigation events (e.g., resource reallocation, application instance updating or patching, application instance termination, application instance migration, resizing of virtual environments, traffic shaping, traffic blocking, etc.) applied to remedy those violations.

Therefore, operational characteristic-based management platform 400 may collect and communicate real time granular insights into an organization's cloud resource utilization that could empower mitigation of resource misutilization, security risk exposure, and network traffic optimization. As a result, operational characteristic-based management platform 400 may generate proactive alerts of policy violations that accelerate discovery and mitigation of resource misallocations among cloud-hosted application instances.

FIG. 5 illustrates an example simplified procedure (e.g., a method) for operational characteristic-based container management, in accordance with one or more embodiments described herein. For example, a non-generic, specifically configured device (e.g., device 200), may perform procedure 500 by executing stored instructions (e.g., container characteristic process 248).

The procedure 500 may start at step 505, and continues to step 510, where, as described in greater detail above, a device may receive operational characteristics of an application instance executing in a container environment. The operational characteristics may be received from a container agent executing in the container environment. For example, the container agent may be an agent instrumented in an application instance and/or a container hosting the application instance. The container agent may monitor and report operational characteristics of the application instance and/or the container during the execution of the application instance.

In various embodiments, the operational characteristics may be computational resource usage metrics for the application instance executing in the container environment. For example, the operation characteristics may be a metric of CPU utilization, memory utilization, disk utilization, etc. as a percentage of a total amount allocated to an application instance and/or a container hosting the application instance.

In addition, the operational characteristics may be an indication of a security status of the application instance. For example, the operational characteristic may be an indication of security patch status, and update status, admin activity, etc. associated with an application instance and/or a container hosting the application instance.

Further, the operational characteristics may be an indication of a criticality of monitored network traffic associated with the application instance. For example, the operational characteristics may include protocols, associated services, business and technical classifications, data access and communications, communication relationships with other resources, etc. or other metrics of traffic criticality associated with the monitored network traffic.

Furthermore, the operational characteristic may be an indication of a usage or activity of the application instance image. For example, the operational characteristics may include metrics of an amount of network traffic, an amount of requests, traffic patterns, traffic frequency, etc. associated with execution of an application instance.

At step 515, as detailed above, the device may determine, based on the operational characteristics, whether the application instance executing in the container environment is associated with a policy violation for application instances. For instance, the device may determine that the application instance executing in the container environment is associated with a policy violation when the indication of the security status of the application instance indicates that the application instance has been orphaned.

Likewise, the device may determine that the application instance executing in the container environment is associated with the policy violation when the indication of the criticality of the monitored network traffic of the application instance indicates that the monitored network traffic of the application instance is non-critical. The device may also determine that the application instance that the application instance executing in the container environment is associated with a policy violation when the indication of resource usage and/or application usage indicates that the application instance is under or over utilizing the computational resources allocated to it and/or is an under or over utilized instance.

At step 520, the device may generate a notification of the policy violation when the device determines that the application instance is associated with the policy violation. Generating a notification of the policy violation may include providing the notification to a dashboard for managing application instances. In various embodiments, generating the notification of the policy violation may include providing the notification to a dashboard for managing application instances.

Further, at step 525, the device may cause the container environment to perform a mitigation action of the policy violation by the application instance. The mitigation action may include blocking of non-critical network traffic at the application instance executing in the container environment. In various embodiments, the mitigation action may include reallocating computing resources of the container environment from the application instance. In additional embodiments, the mitigation action may include reallocating cloud resources, modifying a resource allocation to a particular application instance or container, shutting down or suspending an application instance, performing updating or maintenance to an application instance or container, redirecting network traffic, modifying functionalities of the application instance, etc.

Procedure 500 may end at step 530.

It should be noted that while certain steps within procedure 500 may be optional as described above, the steps shown in FIG. 5 are merely examples for illustration, and certain other steps may be included or excluded as desired. For example, in some instances, the procedure 500 may include additional steps such as assigning an expiration date to the application instance executing in the container environment, and/or flagging the application instance executing in the container environment for a policy violation review of the operational characteristics upon the expiration date. Further, while a particular order of the steps is shown, this ordering is merely illustrative, and any suitable arrangement of the steps may be utilized without departing from the scope of the embodiments herein.

In summary, the techniques herein introduce a way to instrument a monitoring, alerting, and/or location system to proactively identify and mitigate resource misutilization, security risk exposure, and network traffic inefficiencies among application instances using agents instrumented within virtual environments hosting application instances. These techniques empower application managers with granular observations of application instance operational characteristics and the intelligence to rapidly identify and correct cloud resource mis-utilizations identified through the observation of the operational characteristics. Implementing these techniques to rapidly correct inefficiencies and imbalances in cloud resource utilization will improve application performance, network performance, computational performance, application security, etc.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server," "by a controller," by a "backend system," those skilled in the art will appreciate that virtual environment agents of the operational characteristic-based container management system (e.g., container agents, application agents, network agents, language agents, etc.) may be considered to be extensions of the backend system (server or controller) operation, and as such, any process step performed "by a device" or need not be limited to local processing on a specific device, unless otherwise specifically noted as such. Furthermore, while certain aspects are described as being performed by an "agent" or by particular types of agents (e.g., container agents, application agents, network agents, etc.), the techniques may be generally applied to any suitable software/hardware configuration (libraries, modules, etc.) as part of an apparatus or otherwise.

Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:

receiving, by a device and from a container agent executing in a container environment, operational characteristics of an application instance executing in the container environment, the operational characteristics comprising metrics indicative of a maintenance recency for the application instance;

determining, by the device and based on the operational characteristics, whether the application instance executing in the container environment is associated with a policy violation for application instances by comparing the metrics indicative of maintenance recency to a security status recency threshold in a policy for the application instance, the security status recency threshold specifying a recency of one or more of patching, updating, or administrative activity, wherein the policy is configured based on statistical analysis of operational characteristics of the application instances, and wherein determining includes identifying the application instance as an orphaned instance based on the comparison;

generating, by the device, a notification of the policy violation when the device determines that the application instance is associated with the policy violation; and causing, by the device, the container environment to perform a mitigation action of the policy violation by the application instance.

2. The method as in claim 1, wherein the operational characteristics comprise computational resource usage metrics for the application instance executing in the container environment.

3. The method as in claim 1, wherein the operational characteristics comprise an indication of a security status of the application instance.

4. The method as in claim 1, wherein the metrics indicative of maintenance recency include a metric indicative of a recency of one or more of an administrative activity for the application instance, a software update to the application instance, or a security patch applied to the application instance.

5. The method of claim 1, wherein the operational characteristics comprise an indication of a criticality of monitored network traffic of the application instance.

6. The method as in claim 5, further comprising determining that the application instance executing in the container environment is associated with the policy violation when the indication of the criticality of the monitored network traffic of the application instance indicates that the monitored network traffic of the application instance is non-critical.

7. The method as in claim 1, further comprising:

assigning an expiration date to the application instance executing in the container environment; and flagging the application instance executing in the container environment for a policy violation review of the operational characteristics upon the expiration date.

8. The method as in claim 1, wherein the mitigation action comprises blocking of non-critical network traffic at the application instance executing in the container environment.

9. The method as in claim 1, wherein the mitigation action comprises reallocating computing resources of the container environment from the application instance.

10. The method as in claim 1, wherein generating the notification of the policy violation comprises providing the notification to a dashboard for managing application instances.

11. The method of claim 1, wherein the operational characteristics further comprise metrics indicative of a business purpose classification of monitored network traffic associated with the application instance, wherein determining includes identifying whether the application instance executing in the container environment is associated with the policy violation based on whether the business purpose classification is related to a targeted business purpose for the application instance.

12. An apparatus, comprising:

one or more network interfaces;

a processor coupled to the one or more network interfaces and configured to execute one or more processes; and a memory configured to store a process that is executable by the processor, the process when executed configured to:

receive, from a container agent executing in a container environment, operational characteristics of an application instance executing in the container environment, the operational characteristics comprising metrics indicative of a maintenance recency for the application instance;

determine, based on the operational characteristics, whether the application instance executing in the container environment is associated with a policy violation for application instances by comparing the metrics indicative of maintenance recency to a security status recency threshold in a policy for the application instance, the security status recency threshold specifying a recency of one or more of patching, updating, or administrative activity, wherein the policy is configured based on statistical analysis of operational characteristics of the application instances, and wherein to determine includes to identify the application instance as an orphaned instance based on the comparison;

generate a notification of the policy violation when the application instance is associated with the policy violation; and cause the container environment to perform a mitigation action of the policy violation by the application instance.

13. The apparatus of claim 12, wherein the operational characteristics comprise computational resource usage metrics for the application instance executing in the container environment.

14. The apparatus of claim 12, wherein the operational characteristics comprise an indication of a security status of the application instance.

15. The apparatus of claim 12, wherein the metrics indicative of maintenance recency include a metric indicative of a recency of one or more of an administrative activity for the application instance, a software update to the application instance, or a security patch applied to the application instance.

16. The apparatus of claim 12, wherein the operational characteristics comprise an indication of a criticality of monitored network traffic of the application instance.

17. The apparatus of claim 16, further comprising determining that the application instance executing in the container environment is associated with the policy violation when the indication of the criticality of the monitored network traffic of the application instance indicates that the monitored network traffic of the application instance is non-critical.

18. The apparatus of claim 12, the process when executed further configured to:

assign an expiration date to the application instance executing in the container environment; and flag the application instance executing in the container environment for a policy violation review of the operational characteristics upon the expiration date.

19. The apparatus of claim 12, wherein the mitigation action comprises blocking of non-critical network traffic at the application instance executing in the container environment.

20. A tangible, non-transitory, computer-readable medium storing program instructions that cause a device to execute a process comprising:

receiving, by the device and from a container agent executing in a container environment, operational characteristics of an application instance executing in the container environment, the operational characteristics comprising metrics indicative of a maintenance recency for the application instance;

determining, by the device and based on the operational characteristics, whether the application instance executing in the container environment is associated with a policy violation for application instances by comparing the metrics indicative of maintenance recency to a security status recency threshold in a policy for the application instance, the security status recency threshold specifying a recency of one or more of patching, updating, or administrative activity, wherein the policy is configured based on statistical analysis of operational characteristics of the application instances, and wherein determining includes identifying the application instance as an orphaned instance based on the comparison;

generating, by the device, a notification of the policy violation when the device determines that the application instance is associated with the policy violation; and causing, by the device, the container environment to perform a mitigation action of the policy violation by the application instance.

\* \* \* \* \*